Figure 1:
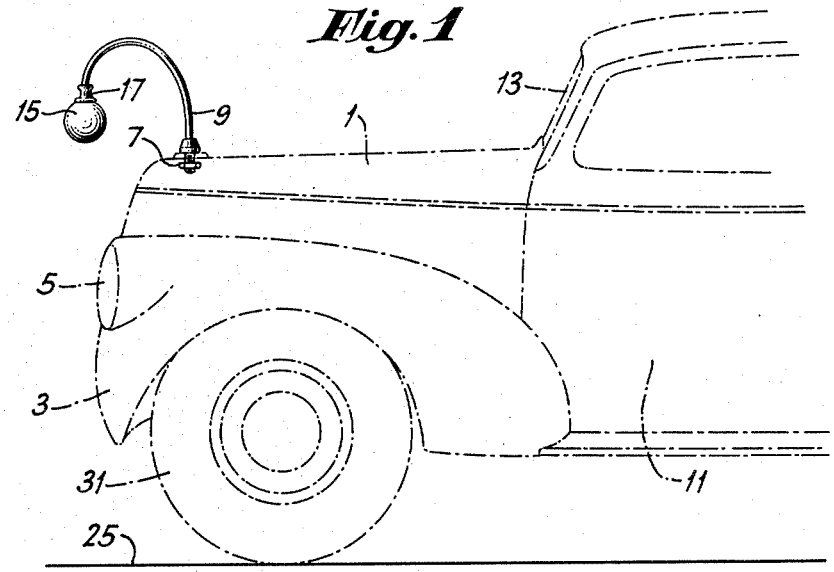

Nov. 19, 1940.  E. G. W. DEHMER  2,222,284
INDICATING DEVICE
Filed Feb. 14, 1939

INVENTOR.
EDWARD G. W. DEHMER
BY
ATTORNEY.

Patented Nov. 19, 1940

2,222,284

UNITED STATES PATENT OFFICE 2,222,284

INDICATING DEVICE

Edward G. W. Dehmer, Port Chester, N. Y.

Application February 14, 1939, Serial No. 256,267

2 Claims. (Cl. 88—93)

The present invention relates to indicating devices which find particular application in use with automobiles and other related types of vehicles.

It is a primary purpose of this invention to provide a device of the indicating type which shall serve as a so-called tell-tale to indicate whether or not headlamps of the vehicle are lit. In addition, a device of this type will furnish a suitable and convenient means by which a driver of a motor vehicle, for example, can ascertain in a most convenient manner the accuracy with which he is following a road guiding line or accurately determine the nearness of the driven vehicle to the curbing in city streets. This becomes particularly desirable to know at the time of parking in particularly limited space where a substantial amount of attention must be given to the nearness to another vehicle immediately ahead or behind so that any arrangement which enables a driver to fix his eyes in the direction of car motion, while still able to sense the lateral positions of curbings or other objects becomes particularly desirable.

It has already been proposed in the prior art to provide indicator means on vehicles to determine whether or not the headlamps were lit. So far as applicant is aware, however, in all previously proposed forms of such devices use was made of lens elements or a substantial number of lenticular like reflecting bodies supported in a nest-like array. This construction naturally made the reflecting devices somewhat expensive. Also, while such prior art devices were of a somewhat reasonably satisfactory nature for use as tell-tale indicators to determine whether or not the headlamps or parking lamps of the vehicle were lit, the devices of the prior art were not capable of use also as a guiding instrumentality. This was because of the light directive properties of the devices and also because of the fact that the lens elements used were so much in the nature of mere shadow casting bodies as to be substantially useless as a true indicator of position.

The present invention, in one of its preferred forms, comprises either a spherical reflecting body or a partially spherical body which is capable of serving as a substantially mirror surface in order that the actual position of a great many objects may be readily indicated to the vehicle driver. Such a reflecting body may easily be attached to the forward portion of the vehicle and arranged to protrude slightly beyond the front of the usual hood portion in order that there may be a substantially unobstructed light path between the reflecting body and the vehicle headlamps as well as along and to each side of the roadway upon which the vehicle is to travel. In such a form the reflecting body may also serve as a front ornament for the vehicle and may have added as a part thereof, where desired, some additional form of ornamentation provided, of course, that such ornamentation does not obstruct the light path between the vehicle driver and the areas which the driver wishes to view in the indicator.

It is thus one of the primary objects of this invention to provide a convenient form of indicating device which shall serve as a mirrored surface to have particular use on a motor vehicle or the like so as to be capable of indicating to the driver various conditions of operation or various locations of the driven vehicle relative to selected areas or objects.

Other objects of the invention are to provide such an indicating device for use on motor vehicles or the like which can be fabricated at a minimum cost and which shall not be subject to breakage in use.

Still further objects and numerous advantages following therefrom will immediately become apparent from the following specification when read in connection with the accompanying drawing, wherein—

Figure 2:
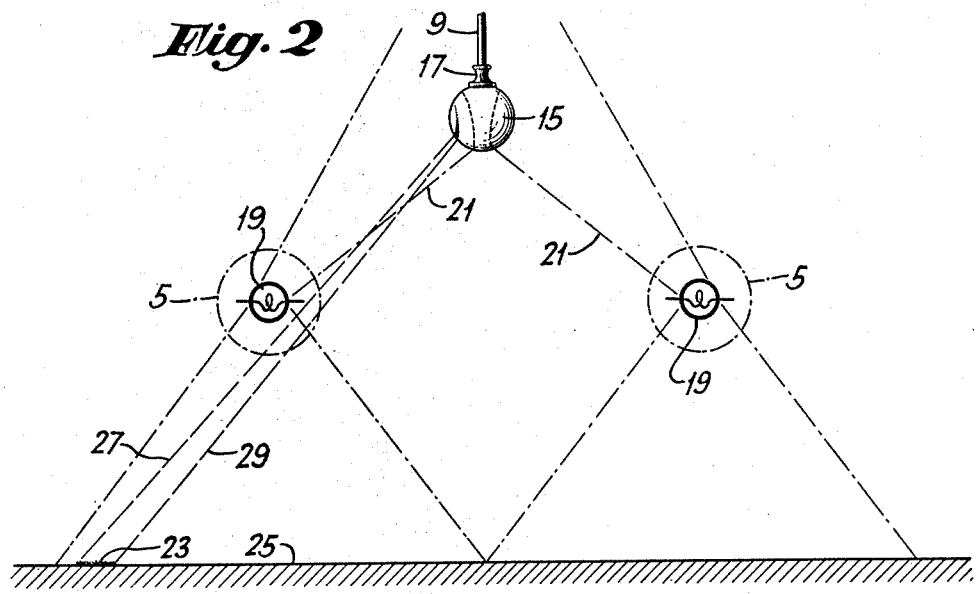

Figure 1 represents in schematic manner an elevational view of the device as installed on a motor vehicle; and, Figure 2 schematically represents a front view to show particularly the optical paths by which desired information is conveyed to the vehicle operator.

Referring to the drawing, the hood of the motor vehicle is represented in a somewhat conventional manner by the reference 1. Extending outwardly from the hood of the vehicle are the usual fenders 3 into which the headlamps 5 are usually streamlined. Supported from the front end of the vehicle hood 1 (for instance, at the radiator cap or equivalent location) is a supporting means 7 into which there is suitably fastened a bracket element 9. The support bracket 9 is usually positioned substantially centrally of the forward end of the hood and in the path of vision of the vehicle operator, who is seated within the body member 11 so as to view the forward end of the hood through the windshield 13.

The support bracket 9 is preferably curved, as indicated, so as to form substantially a U-shaped member having suitably secured to the forward end thereof the spherical, or partially spherical, reflector element 15. The reflecting element 15, although a complete or partial spheroid of revolution will herein be referred to as a spherical element for convenience, but from an inspection of Figure 2 it will be appreciated that only that portion which is to reflect desired objects to the driver's line of vision need not be completely spherical where design choice makes desirable other formations for such portions of the reflector as are not optically useful to the purposes of this invention.

In one of its preferred forms, the reflector element 15 may be a metallic hollow member which is internally threaded so that the bushing element 17, which is attached to the support bracket 9, may be attached. The outer surface of the reflector element is then provided with a mirror-like surface in any suitable manner. One form of such reflector element which has proven to be highly efficient in use is a hollow member which has been provided with a plating of chromium. Such a surface coating is weather resistant and not readily subject to tarnish. It is also advantageous in that when clouded by road splash, it can readily be restored to its highly reflecting state merely by cleaning with a dry cloth. At the same time, the coated surface is not subject to breakage, nor is the reflecting surface subject to any chipping away of the coated portions. These factors tend to insure that the reflecting surface need never be replaced during the life of the vehicle, unless the reflector be damaged along with other portions of the vehicle through collision or the like.

By referring to Figure 2 of the drawing, it can readily be seen that the image of the lamps 19, contained within the headlamps 5 is imaged in the reflector 15 along the optical paths 21. Similarly, any roadway markers 23, or curbs of roadways 25 which are located when the vehicle is to be parked in relatively similar locations, are imaged in the reflector element 15 along the optical paths conventionally represented as 27 and 29. Since the complete reflector 15 is in the path of view of the vehicle driver, he can at once sense through observation by the width of the reflection in the reflector member 15 the relative width of the marker strip or the relative distance of the car wheels 31 from the curb or marking strip.

It has been found that the reflecting element 15 may be formed cheaply in manufacturing by stamping the surface of revolution from a substantially flat piece of any suitable metal, and then subsequently plating the mirror-like surface upon the stamped surface thereof which is to be located in the path of vision of the vehicle operator. This provides further a convenient means by which auxiliary ornaments may be secured to the forward end of the reflecting body since the stamping can readily form also flanges or tabs to which the auxiliary ornamentation can be secured. It has the still further advantage of extreme lightness so that the effects of road shock and the like shall not readily cause the reflector or its supports to jar loose in use.

This indicator also provides a convenient means of indicating to the driver for night driving whether the vehicle lamps are lit. It is well known that in city driving at night, and particularly in rainy weather, because of roadway illumination, it is difficult to tell whether or not headlamps are illuminated, but use of the indicator device herein described overcomes all such difficulty. The indicator also serves to prevent many road accidents because at no time is there ever a need for the driver to divert his attention from the roadway to observe tell-tale lamps on the car dashboard which can be used.

Having now described the invention, what is claimed is:

1. An indicator device for vehicles having headlamps supported upon the forward portion thereof and external to a direct viewing path of the vehicle operator comprising a support element adapted to be secured to the forward portion of the vehicle and to protrude therefrom in a forward direction to a plane forward of the plane of the vehicle headlamps, a viewing member formed at least partially as a spheroid of revolution secured to the support means so as to be supported relative to the vehicle at a point forward of the plane of the vehicle headlamps and in such location relative to the support means and the vehicle that the spheroidal surface of revolution is in the direct viewing path of the vehicle operator, the convex surface of said spheroidal surface of revolution being a reflecting surface area so that the vehicle operator may view therein images of the vehicle headlamps and areas normally external to a direct path of vision.

2. An indicator device for vehicles having headlamps supported upon the forward portion thereof comprising a support element adapted to be secured to the vehicle and to extend relative thereto in a direction forward to a point in the path of direct vision of the vehicle operator which is forward of all points lying in the plane of the vehicle headlamps, a viewing element secured to the support element so as to be positioned thereby at a point relative to the vehicle which is forward of the vehicle headlamps and in the path of direct vision of the vehicle operator, said viewing element having the surface area thereof which faces the vehicle and which is in the path of direct vision of the vehicle operator of substantially spherical character, said element also having the convex spherical surface thereof which is to be supported within the path of direct vision of the vehicle operator formed as a reflecting element so as to enable the vehicle operator to view therein reflections of images of the vehicle headlamps and areas normally external to direct paths of vision.

EDWARD G. W. DEHMER.